United States Patent [19]

Piccone

[11] 4,262,634

[45] Apr. 21, 1981

[54] DISPOSAL DEVICE FOR ANIMALS

[76] Inventor: James Piccone, 803 Kathy Dr., Yardley, Pa. 19064

[21] Appl. No.: 75,912

[22] Filed: Sep. 17, 1979

[51] Int. Cl.³ ............................................ A01K 1/035
[52] U.S. Cl. ..................................................... 119/1
[58] Field of Search .................... 119/1; 4/1, 134, 438, 4/441, 238

[56] References Cited

U.S. PATENT DOCUMENTS

| | | | |
|---|---|---|---|
| 1,006,812 | 10/1911 | Ward | 4/238 |
| 3,227,138 | 1/1966 | Campbell | 119/1 |
| 3,316,880 | 5/1967 | Jungles et al. | 119/1 |
| 3,386,417 | 6/1968 | Machowski | 119/1 |
| 3,601,093 | 8/1971 | Cohen | 119/1 |
| 3,656,457 | 4/1972 | Houston | 119/1 |
| 3,747,563 | 7/1973 | Brockhouse | 119/1 |
| 3,762,369 | 10/1973 | Barnum | 119/1 |
| 3,822,671 | 7/1974 | Rosenberg | 119/1 |
| 3,842,803 | 10/1974 | Temel | 119/1 |
| 3,921,582 | 11/1975 | Sedlmeir | 119/1 |
| 4,027,625 | 6/1977 | Wheeler | 119/1 |

*Primary Examiner*—Hugh R. Chamblee
*Attorney, Agent, or Firm*—John J. Kane; Frederick A. Zoda; Albert Sperry

[57] ABSTRACT

A disposal device for animals such as cats which is particularly usable by being secured to conventional toilet bowls wherein the disposal device includes a first and second platform member each being generally semi-circular extending horizontally across the upper opening of a conventional toilet at a location below the water inlet holes thereof, each of the platforms is secured to the toilet such as to be pivotal from an upper position to a lower position with respect thereto, a controlling assembly is secured to the first platform member to move it between an upper position and a lower position and the second platform member rests upon the first platform member and as such is controlled in movement also by the controlling assembly, the disposal device further including a stopping device fixedly attached with respect to the toilet bowl and to the second platform member to hold it in a predetermined second downward position such that movement by the controlling assembly of the first platform downwardly will allow it to release the second platform which in the upper position rests upon the first platform and the second platform will then fall downwardly until it is stopped by the stopping device in a predetermined lower position such that further movement by the controlling assembly of the first platform in the upward direction will then contact the under surface of the second platform and urge it upwardly to be held again, leaning upon the top of the first platform in the second upward position.

16 Claims, 4 Drawing Figures

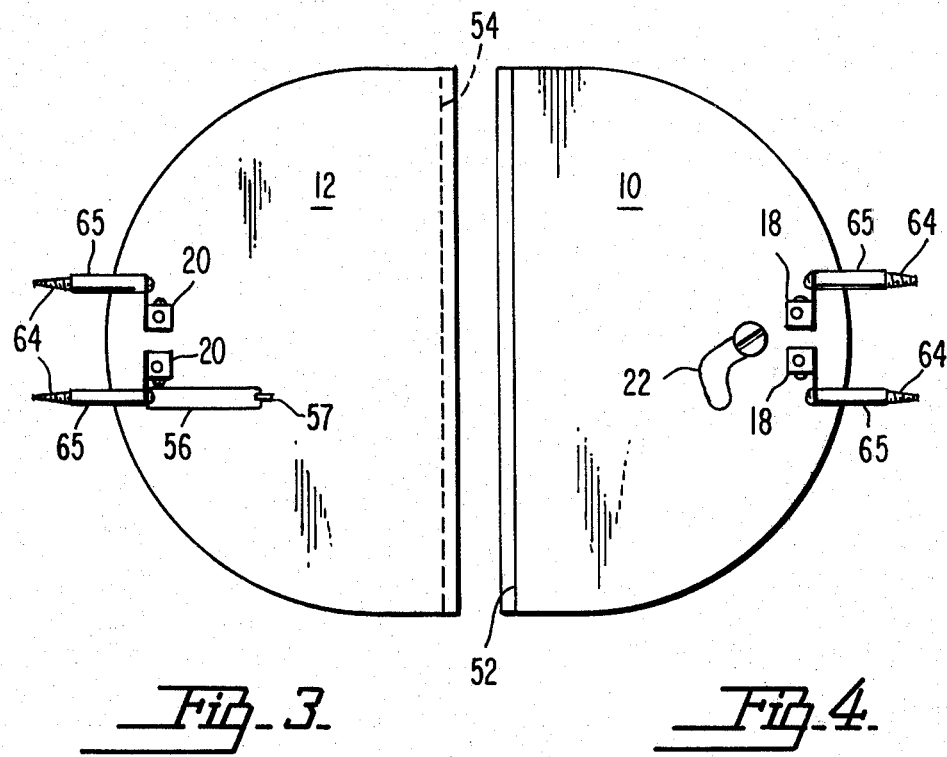

DISPOSAL DEVICE FOR ANIMALS

BACKGROUND OF THE INVENTION

1. Field of the Invention

The present invention deals with the field of devices utilizable for the disposal of animal waste particularly usable with cats and other similar animals which normally use litter boxes.

Normally, a litter box is used which utilizes a litter material therein which includes deodorizing and absorbing particles for minimizing the offending smells eminating from a cat waste box. The present invention provides a device for replacing such systems.

2. Description of the Prior Art

Many prior art devices have been utilized concerning pet toilets such as U.S. Pat. Nos. 3,277,138; 3,316,880; 3,386,417; 3,656,457; 3,747,563; 3,762,369; 3,822,671; 3,921,582; and 4,027,625. Of particular importance is U.S. Pat. No. 3,656,457 utilizing a single moving plate for collecting dog litter. Also particularly pertinent is U.S. Pat. No. 3,316,880 disclosing a cat litter box which is automatic including multiple moving plates. Neither of these devices discloses the simple configuration of the dual platform assemblies of the present invention which is readily adaptable to be secured to a conventionally styled toilet bowl assembly and as such the present invention is a novel improvement in the art.

SUMMARY OF THE INVENTION

A disposal device as provided by the present invention for use by animals particularly cats wherein the device is secured to a conventional toilet bowl. The device includes a first and second platform means which are each generally semi-circular with the straight edge of each abutting one another and positioned extending approximately horizontally across the upper opening of a conventional toilet bowl at a location somewhat below the water inlet holes thereof. The two platforms together provide a single horizontally extending platform which is adapted to receive the animal feces released into the toilet cavity to prevent them from traveling downwardly immediately into the toilet water therebelow. In this manner, the problems of fright and noise which have heretofore prevented animals such as cats and the like from using standardly configured toilet bowls will be overcome.

The second platform means is positioned with the lower surface thereof engaging the upper surface of the first platform means to hold the second platform means in the horizontal position. The first platform means is held in the horizontal position by way of a control means which is adapted to operably control upward and downward movement of this first platform means only. The movement of the second platform means is from an upper position held in place by abutting the upper surface of the first platform means to a lower position which is predetermined by a stopping means. This stopping means is adaptable to hold the platform means in a lower position by way of a wire means or abutment surface adapted to engage the second platform means after it has been released by the first platform means.

When the feces are released by the animal they will contact and come to rest upon either the first or second platform means. At some time later, controlled by a crank or time operated motor, the control means will cause downward movement of the first platform means. Consequently, the second platform means will be released and will be moved downwardly to the predetermined lower position thereof where it will be stopped by the stopping means from further downward movement. The control means will then cause the first platform means to move downwardly to its final lower position and thereby release the feces into the toilet water therebelow.

After an instantaneous haulting of the first platform means in the lower position, the control means will then operably cause the first platform means of move in an upwardly direction until it contacts the under surface of the second platform means to thereby start the second platform means also in the upward direction. The control means will cause further upward movement of the first platform means which is now also causing upward movement of the second platform means until the notched edges interlock in the approximately horizontally extending position and then the initial horizontal orientation of the two platform means will have been recreated, such as to be ready for use again.

The control means may preferably include a nut member which is attached with respect to the first platform means and which defines a central bore therethrough. A threaded male member may extend threaded into the threaded central bore therethrough. A threaded male member may extend threaded into the threaded central bore thereof and the threaded male member may be secured to a cable means. This cable means preferably is secured to a gear means which is driven itself by either a cranking means or a time or other such motor means to cause rotation of the gear means with consequential rotation of the cable means further causing rotation of the threaded male member within the threaded central bore of the nut member to cause the upward and downward movement of the first platform means and consequently the second platform means.

It is an object of the present invention to provide a simple disposal device to be usable in place of cat litter boxes.

It is an object of the present invention to provide a disposal device particularly usable secured to conventional toilet bowls for use by animals such as cats and the like.

It is an object of the present invention to provide a disposal device which includes two simply movable platform means adapted to engage one another and provide an elevated platform for receiving cat feces and preventing the direct movement of such feces into the toilet water therebelow.

It is an object of the present invention to provide a disposal device which is secured to the walls of the toilet bowl at a location below the water inlet holes thereof to allow for complete flushing of the upper surfaces of the platform means.

It is an object of the present invention to provide a disposal device for usage by cats and other such animals which includes a controlling device which is operable by way of a crank to cause disposal of the feces gathered by the two platform means.

It is an object of the present invention to provide a disposal device which is adaptable to be connected to a motor means to cause automatic release of waste material gathered thereby.

It is an object of the present invention to provide a disposal device which is usable secured to a drive means such as a time operated motor for allowing predetermined intervals between releasing of the waste material into the toilet water therebelow.

It is an object of the present invention to provide a disposal device usable for the placement of cat litter boxes which is simple to construct and relatively inexpensive in cost.

It is an object of the present invention to provide a disposal device for animals such as cats which is relatively maintenance free.

It is an object of the present invention to provide a disposal device usable for animals such as cats and the like which is adaptable to be connected securely to any type of conventionally configured toilet bowl.

It is an object of the present invention to provide a disposal device which is secured to the conventional toilet bowl in the water inlet holes thereof.

It is an object of the present invention to provide a disposal device for animals such as cats and the like which is slightly tilted to the rearward direction to allow the sliding of urine rearwardly off of the upper surfaces of the platform members.

It is an object of the present invention to provide a disposal device for animals such as cats and the like which is usable secured to conventional toilet bowls which is easy to remove in order to allow standard usage of the toilet.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a top plan view of an embodiment of a second securement means of a second platform of the present invention; and FIG. 4 is a top plan view of an embodiment of a first platform means of the present invention.

DETAILED DESCRIPTION OF THE PREFERRED EMBODIMENT

Figure 1:
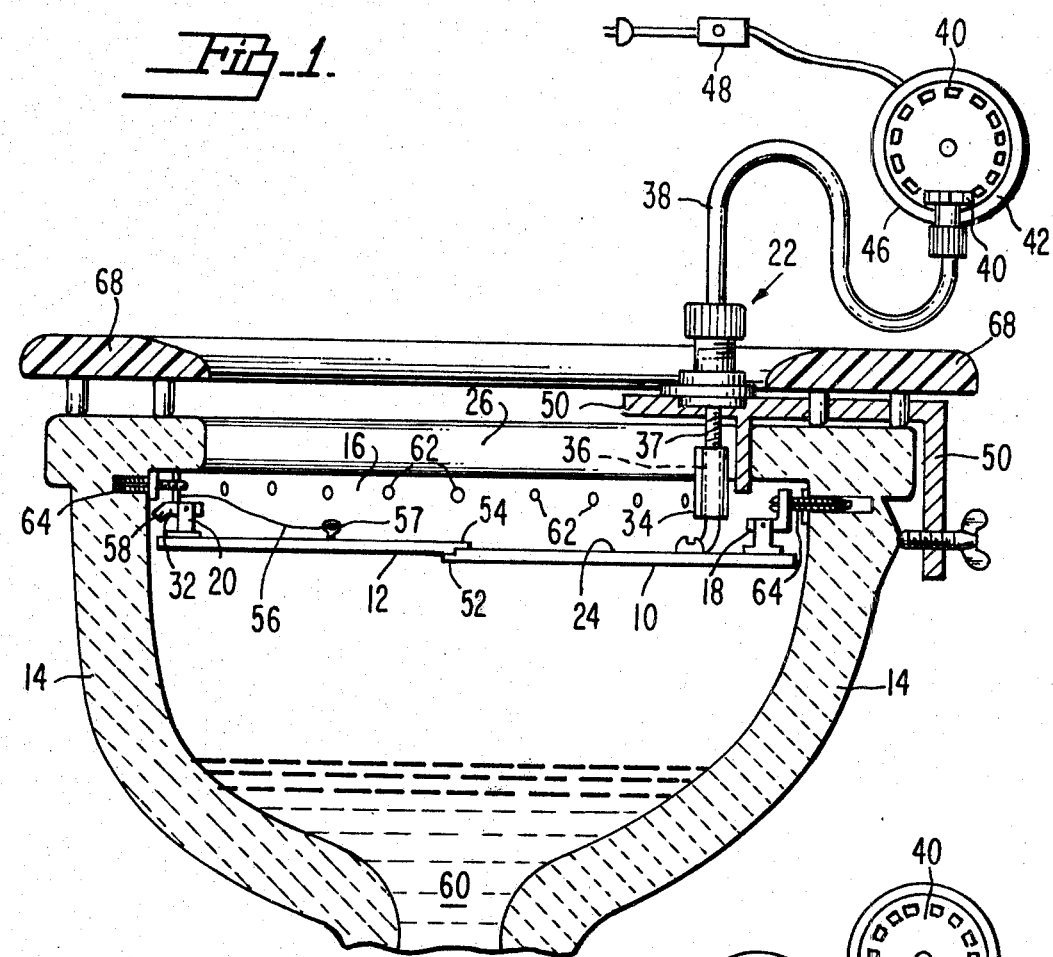
FIG. 1 is a front elevational cross section showing the disposal device showing an embodiment of the disposal device in the upper position.

The present invention provides a disposal device for usage by animals such as cats and the like which is particularly adaptable secured to a conventional toilet bowl 14. The disposal device comprises a first platform means 10 which is generally semi-circular and is positioned extending approximately horizontally across half of the upper opening of the toilet bowl 14 and is pivotally secured thereto. Similarly, the second platform means 12 is also semi-circular with the straight edge thereof resting against the upper surface of the straight edge of the first platform means 10. The second platform means 12 in combination with the first platform means 10 providing a horizontal platform extending across the upper opening 16 of the toilet somewhat below the water inlet flushing apertures 62.

The first platform means is secured to the bowl 14 by way of a first securement means 18 and the second platform means is secured to the toilet bowl 14 by a second securement means 20. The first securement means 18 allows pivotal movement of the first platform means 10 between a first upper position 24 and a first lower position 28. Similarly, the second securement means 20 allows pivotal movement of the second platform means 12 between a second upper position 26 and a second lower position 30.

Movement of the first platform means between the first upper position 24 and the first lower position 28 is caused by a control means 22. This control means is operably secured to the first platform means to actually control upward and downward movement of that platform means only. The second platform means 12 is adapted to rest upon the first platform means when located in the second upper position 26 and is adapted to be released when the first platform means 10 moves downwardly. The second platform means will be held in the lower position thereof by a stop means 32 which is adapted to limit the downward movement of the second platform means 12 to a second lower position which can be picked up when the control means 22 causes upward movement of the first platform means and the upper surface of the first platform means 10 contacts the lower surface of the second platform means 12 during this upward movement.

Control means 22 may take a variety of forms but for the purposes of the present embodiment a nut member 34 is included secured to the first platform means 10. The nut member 34 will define a threaded central bore 36 therein which is mated to receive a threaded male member 37. Threaded male member 37 is secured to a cable means 38 which operationally secures the threaded male member 37 to a gear means 40. Gear means 40 is secured to a drive means 42 which is adapted to cause rotation of the gear means and consequential rotation of the cable means 38. In this manner actuation of the drive means 42 will cause rotation of the threaded male member 37 within the threaded central bore 36 and will effect the upward and downward movement of the first platform member from the first upper position 24 to the first lower position 28 and vice versa.

Drive means 42 may take the form of a cranking means 44 including a handle member 45 which is adapted to be secured and rotated to cause rotation of the gear means 40. Alternatively, in the automated system a motor means 46 may be included which may be time operated or otherwise capable of actuation to cause rotation of the cable means 38. In particular, a switch means 48 may be included between the motor means 46 and the electrical supply to cause desired operation of the motor means 46.

Figure 2:
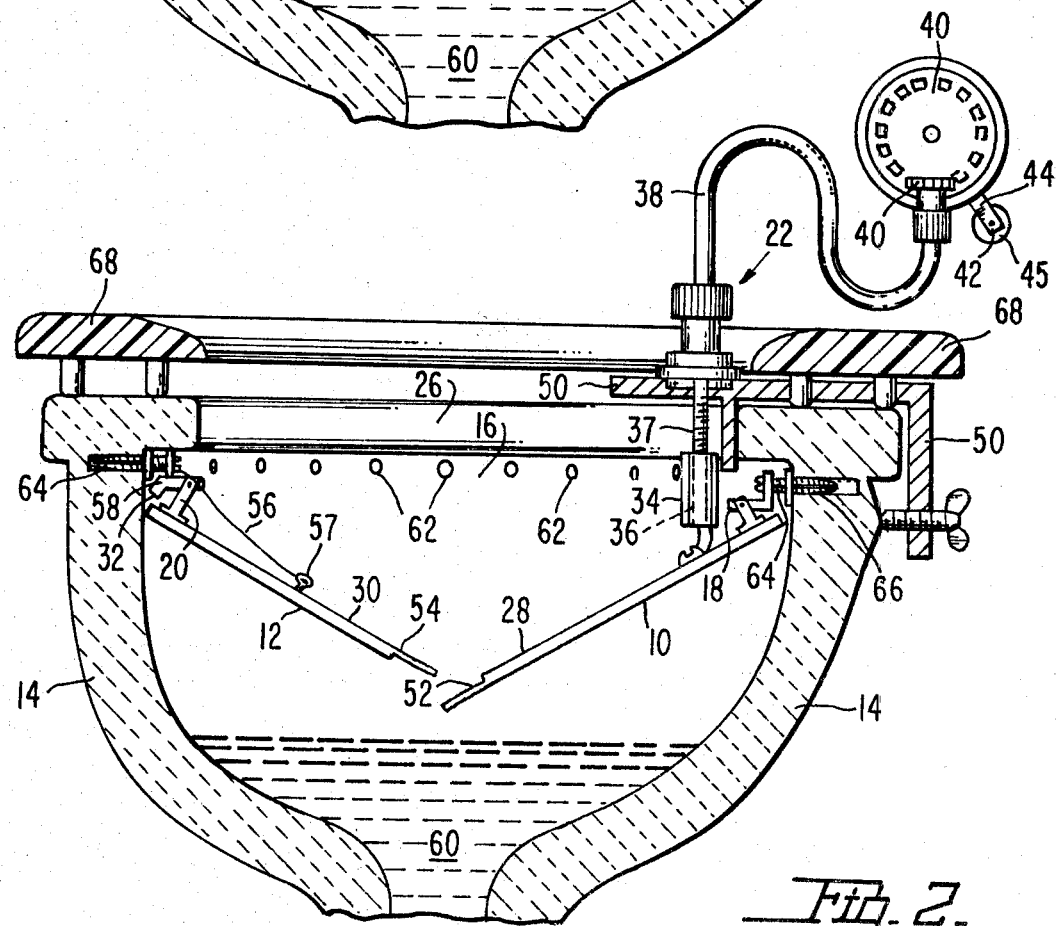
FIG. 2 is a front elevational cross section showing the disposal device showing an embodiment of the disposal device in the lower position.

In the embodiment shown in FIGS. 1 and 2 a bracket member 50 is included to provide a means of securement of the control means 22 to the toilet bowl 14 at a location below the toilet seat 68.

To facilitate interconnection between the first platform means 10 and the second platform means 12 a notched innermost straight first edge 52 may be included in the first platform means 10. A mated but oppositely notched innermost straight second edge 54 may be included on the second platform means 12. In this manner when in the horizontally extending position as shown in FIG. 1 the notches will interlock and enhance securement between the two platform means.

In order to limit downward movement of the second platform means 12 the stop means 32 may take the form of a wire means 56 attached to an eyelet 57 such that the downward movement of the second platform means 12 will be limited. In this manner the second platform means 12 will not be caused to fall into the toilet water 60 therebelow and the lower surface of the second platform means 12 will be in a position available to be picked up by the first platform means 10 when the control means 22 causes it to be moved in the upward direction.

To provide the first and second securement means 18 and 20 a plurality of screw means 64 may be included adapted to be placed within expandable collars 65 which may then be placed within the readily available bowl wash apertures 62 to provide the means of securement to the toilet bowl 14. To allow continued usage of that particular bowl wash aperture 62 into which the screw means 64 is secured a hollow central bore 66 may be defined down the central axis of the screw means 64 to allow the water to continue to move therethrough to some extent even though that particular aperture is being utilized for one of the securement means.

It is preferable to have the first and second platform means 10 and 12 tilted in either a forwardly or rearwardly direction in order to allow the draining of urine easily therefrom. Also this slight tilting facilitates the draining of water therefrom. Preferably the securement of the platform means to the toilet bowl 14 will be at a location such that the upper surface of the platform means will be slightly below the bowl wash apertures 62. In this manner flushing of the toilet will cause flushing of the upper surfaces of the platform means to cause complete purging or washing of the system.

In operation the first platform means 10 and the second platform means 12 will be held in the horizontally extending position or first upper position 24 and second upper position 26, respectively. In this orientation as shown in FIG. 1 the waste material from the animal will be released downwardly therein. The horizontal platform presented by the two platform means will receive and hold the waste material thereon. By timed operation or by purposeful operation of the drive means 42 the control means 22 will initiate downward movement of the first platform means 10. As the first platform means moves downwardly at some predetermined point the second platform means will be released therefrom since the second platform means was resting on the upper surface of the first platform means 10. The second platform means will then immediately fall downwardly to the second lower position 30 and will be held in that position by the wire stop means 56 as shown in FIG. 1. Alternatively, this stop means 32 may be formed by a protruding edge 58 of the second securement means 20 which may be adaptable to contact any surface fixedly maintained with respect to the second platform means 12 to limit downward movement thereof. This contacting configuration is shown in FIG. 2.

The control means 22 will then cause the first platform means 10 to be moved downwardly until it reaches the first lower position 28 at which time the notched innermost edges 52 and 54 of the platform means 10 and 12 will be disengaged and the waste material will be released therebelow to fall into the toilet bowl water 60. During this time the flushing operation will also be taking place and as such the flushing water will be coming out of the wash apertures 62 and be caused to run along the upper surface of both platform means to facilitate cleansing thereof.

After a predetermined delay period the control means 22 will initiate upward movement of the first platform means 10. This upward movement will continue until the upper surface of the first platform means 10 contacts the lower surface of the second platform means 12 at which time the upper movement of the second platform means will be initiated. Both of the platforms will then be caused to move upwardly by the control means 22 until they have reached the horizontally extending configuration shown in FIG. 1. At this time the cycle will be completed and the system will be capable of receiving further waste material.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A disposal device for animals such as cats, and particularly usable secured to conventional toilet bowls, which comprises:
    (a) a first platform means positioned extending approximately horizontally across approximately half the upper opening of a conventional toilet bowl and being pivotally movable with respect thereto;
    (b) a first securement means fixedly secured to the conventional toilet bowl and adapted to secure said first platform means thereto;
    (c) a second platform means positioned extending approximately horizontally across the other half of the upper opening of a conventional toilet bowl and being pivotally movable with respect thereto, said second platform means adapted to rest upon said first platform means to be maintained in the horizontal orientation;
    (d) a second securement means fixedly attached to the conventional toilet bowl and adapted to secure said second platform means thereto;
    (e) a control means secured to said first platform means and adapted to operably control pivotal movement of said first platform means from a first upper position extending approximately horizontal across about half of the upper opening of a conventional toilet bowl to a first lower position extending obliquely downwardly into the conventional toilet bowl, said second platform means being downwardly pivotable from a second upper position to a second lower position responsive to pivotal movement of said first platform means away therefrom upon pivoting to the first lower position; and
    (f) stop means fixedly attached with respect to the conventional toilet bowl to limit the downward pivotal movement of said second platform to a predetermined second downward position.

2. The device as defined in claim 1 further including a bracket member secured to the conventional bowl to provide a mounting location for said control means.

3. The device as defined in claim 1 wherein said first platform means includes a notched innermost first edge and said second platform means includes a notched innermost second edge oppositely mated with respect to said first edge to facilitate engagement therebetween when said first platform means and said second platform means are maintained in said first upper position and second upper position, respectively.

4. The device as defined in claim 1 wherein said stop means comprises a wire means fixedly secured to said second platform means and with respect to the conventional toilet bowl.

5. The device as defined in claim 1 wherein said stop means comprises a protruding edge of said second securement means adapted to abut said second platform means and prevent further movement thereof upon reaching the predetermined second lower position.

6. The device as defined in claim 1 wherein said first platform means and said second platform means are semi-circular.

7. A disposal device for animals such as cats, and particularly usable secured to conventional toilet bowl, which comprises:
  (a) a first platform means positioned extending approximately horizontally across approximately half the upper opening of a conventional toilet bowl and being pivotally movable with respect thereto;
  (b) a first securement means fixedly secured to the conventional toilet bowl and adapted to secure said first platform means thereto;
  (c) a second platform means positioned extending approximately horizontally across the other half of the upper opening of a conventional toilet bowl and being pivotally movable with respect thereto, said second platform means adapted to rest upon said first platform means to be maintained in the horizontal orientation;
  (d) a second securement means fixedly attached to the conventional toilet bowl and adapted to secure said second platform means thereto;
  (e) a control means secured to said first platform means and adapted to operably control pivotal movement of said first platform means from a first upper position extending approximately horizontal across about half of the upper opening of a conventional toilet bowl to a first lower position extending obliquely downwardly into the conventional toilet bowl, said second platform means being downwardly pivotable from a second upper position to a second lower position responsive to pivotal movement of said first platform means away therefrom upon pivoting to the first lower position, said control means further comprising;
    1. a nut member attached with respect to said first platform means, said nut member defining a threaded central bore therethrough;
    (2) a threaded male member positioned threaded within said threaded central bore of said nut member;
    (3) a cable means operationally secured at one end to said threaded male member to be rotatable therewith; and
    (4) a gear means secured to the other end of said cable means to be rotatable therewith in order that rotation of said gear means will cause rotation of said threaded male member within said threaded central bore of said nut member to allow raising and lowering of said first platform means; and
  (f) stop means fixedly attached with respect to the conventional toilet bowl to limit the downward pivotal movement of said second platform to a predetermined downward position.

8. The device as defined in claim 7 further comprising a drive means attached with respect to said gear means, said gear means being rotatable, responsive to actuation of said drive means to cause similar rotational movement of said cable means as well as said threaded male member within said nut member to allow raising and lowering of said first platform means.

9. The device as defined in claim 8 wherein said drive means comprises a cranking means.

10. The device as defined in claim 8 wherein said drive means comprises a motor means.

11. The device as defined in claim 10 further including a switch means to selectively actuate said motor drive means.

12. A disposable device for animals such as cats, and particularly usable secured to conventional toilet bowls, which comprises;
  (a) a first platform means being semi-circular and positioned extending approximately horizontally across approximately half of the upper opening of a conventional toilet bowl and being pivotally movable with respect thereto, said first platform means including a notched innermost straight first edge;
  (b) a first securement means fixedly attached to the conventional toilet bowl and adapted to secure said first platform means thereto;
  (c) a second platform means being semi-circular and positioned extending approximately horizontally across the other half of the upper opening of a conventional toilet bowl and being pivotally movable with respect thereto, said second platform means adapted to rest upon said first platform means to be maintained in the horizontal orientation, said second platform means including a notched innermost straight second edge oppositely mated with respect to said first edge to facilitate engagement therebetween when said first platform means and said second platform means are maintained in said first upper position and said second upper position, respectively;
  (d) a second securement means fixedly attached to the conventional toilet bowl and adapted to secure said second platform means thereto;
  (e) a control means secured to said first platform means and adapted to operably control pivotal movement of said first platform means from a first upper position extending approximately horizontal across about half of the upper opening of a conventional toilet bowl to a first lower position extending obliquely downwardly into the conventional toilet bowl, said second platform means being downwardly pivotable from a second upper position to a second lower position responsive to pivotal movement of said first platform means away therefrom upon pivoting to the first lower position, said control means further comprising;
    1. a nut member attached with respect to said first platform means, said nut member defining a threaded central bore therethrough;
    2. a threaded male member positioned threaded within said threaded central bore of said nut member;
    3. a cable means operationally secured at one end to said threaded male member to be rotatable therewith; and
    4. a gear means secured to the other end of said cable means to be rotatable therewith in order that rotation of said gear means will cause rotation of said threaded male member within said threaded central bore of said nut member to allow raising and lowering of said first platform means;

5. a bracket member secured to the conventional toilet bowl to provide a mounting location for the end of said cable means attached to said threaded male member; and
6. stop means fixedly attached with respect to the conventional toilet bowl to limit the downward pivotal movement of said second platform to a predetermined second downward position, said stop means comprising a wire means fixedly attached to said second platform means and with respect to the conventional toilet bowl.

13. The device as defined in claim 12 further comprising a drive means attached with respect to said gear means, said gear means being rotatable, responsive to actuation of said drive means to cause similar rotational movement of said cable means as well as said threaded male member within said nut member to allow raising and lowering of said first platform means.

14. The device as defined in claim 13 wherein said drive means comprises a cranking means.

15. The device as defined in claim 13 wherein said drive means comprises a motor means.

16. The device as defined in claim 15 further including a switch means to selectively actuate said motor drive means.

* * * * *